United States Patent [19]

Wharton

[11] Patent Number: 4,723,790
[45] Date of Patent: Feb. 9, 1988

[54] TORSION SPRING CARTRIDGE

[75] Inventor: Charles E. Wharton, Lake Bluff, Ill.

[73] Assignee: TLW, Inc., Lake Bluff, Ill.

[21] Appl. No.: 836,056

[22] Filed: Mar. 4, 1986

[51] Int. Cl.$^4$ ............................................. B60G 11/20
[52] U.S. Cl. ..................................... 280/700; 267/279; 280/721; 280/689
[58] Field of Search ............... 280/700, 717, 721, 689, 280/723; 267/57, 154, 57.1 R; 188/130

[56] References Cited

U.S. PATENT DOCUMENTS

| | | | |
|---|---|---|---|
| 1,338,556 | 4/1920 | Craig | 188/130 |
| 1,480,663 | 1/1924 | Camporini | 188/130 |
| 2,082,509 | 6/1937 | Rabe | 280/700 |
| 2,149,374 | 3/1939 | Wellman | 188/130 |
| 2,163,131 | 6/1939 | Porsche | 267/57 |
| 2,169,373 | 8/1939 | Porsche | 267/15 R |
| 2,169,850 | 8/1939 | Rabe | 267/57 |
| 2,662,236 | 12/1953 | Kester | 114/344 |
| 2,779,602 | 1/1957 | Kimbro et al. | 280/43.18 |
| 3,047,283 | 7/1962 | Kivell | 267/9 R |
| 3,330,558 | 7/1967 | Simons, Jr. | 272/68 |
| 3,625,545 | 12/1971 | Somers et al. | 280/170 |
| 3,844,583 | 10/1974 | Sakow et al. | 280/721 |
| 4,194,761 | 3/1980 | Falk et al. | 280/705 |
| 4,470,616 | 9/1984 | Kaneko et al. | 280/721 |
| 4,521,033 | 6/1985 | Backhaus et al. | 280/700 |
| 4,544,180 | 10/1985 | Maru et al. | 280/689 |
| 4,580,808 | 4/1986 | Williams | 280/700 |
| 4,596,401 | 6/1986 | Jullien | 280/700 |
| 4,637,628 | 1/1987 | Perkins | 280/700 |

FOREIGN PATENT DOCUMENTS 743996 1/1933 France .
WO85/03750 8/1985 PCT Int'l Appl. .

Primary Examiner—Richard A. Bertsch
Attorney, Agent, or Firm—Garrettson Ellis

[57] ABSTRACT

A torsion bar suspension unit includes a pair of hubs, one of which is attached to a rotationally oscillatable member, and torsion bar means secured and extending between the two hubs. Various improvements to the structure are provided.

25 Claims, 10 Drawing Figures

TORSION SPRING CARTRIDGE

BACKGROUND OF THE INVENTION

In International Patent Application PCT/US 84/00226 (International Publication No. WO 85/03750) a torsion spring cartridge assembly is disclosed which may be used for supporting wheels on trailers or other vehicles, and has significant advantages over its prior art. A corresponding U.S. application of the same title exists: U.S. application Ser. No. 781,149, filed Aug. 14, 1985, now abandoned.

As one disadvantage of the structure disclosed in the International Application, it is relatively expensive to manufacture. Additionally, if subjected to excessive loads or bumps, the torsion spring cartridge assembly of the International Application can rotate beyond its mechanical limits, causing breakage of the torsion rods used therein.

Also, because it is desirable for improved functioning of the torsion spring cartridge assembly of the type of the International Application to have torsion rods that do not rotate, the rods are shown to be of rectangular cross-section, being retained at their ends in rectangular holes in a pair of spaced hubs. Rectangular or other non-circular holes in a hub of the type used in the International Application can be made only by broaching, an expensive process. Furthermore, the rectangular torsion bars must be peened for optimum utility, and are capable of mechanical failure to a greater degree than cylindrical rods, since their rectangular corners are more subject to failure under torsion stress.

The invention of this application overcomes the disadvantages described above. Additionally, the torsion bar suspension unit of this invention may be easily installed and replaced on a vehicle or any other desired object. Thus, the invention of this application provides great economies in torsion bar suspensions for wheels or any other desired use, for example, as a suspension system for trailers or the like. Additionally, large objects may have the suspension system of this invention installed under them for the temporary addition of wheels. Then, they may be rolled to a desired location, and the suspension systems may be removed and used elsewhere.

Additionally, the amount of torsion can be adjusted by varying the number of torsion bars used in the system, so that the same torsion bar suspension unit may be easily modified by simply adding or subtracting torsion bars as may be desired. Furthermore, upon axle failure following abuse of the system, torsion bar systems in accordance with this invention have much less tendency to cause loss of control.

DESCRIPTION OF THE INVENTION

In accordance with this invention, a torsion bar suspension unit is provided which includes a bearing assembly including a torque hub capable of rotary motion thereon. Means are provided for attaching the torque hub to a rotationally oscillatable member such as a wheel arm.

A rotationally stationary hub is also provided, spaced from the torque hub. At least one torsion bar, and preferably about 2 to 8 torsion bars, are secured to and extend between the torque hub and stationary hub.

In accordance with this invention, the torsion bar (or bars) may be generally circular cross-section in its intermediate portion, spaced from its ends. The torsion bar ends fit into apertures which are respectively defined in the torque and stationary hubs, with the torsion bar ends being of non-circular cross-section to prevent rotation of the bars.

As the result of this, an improved torsion bar is provided, with less likelihood of torsion bar failure at the extremes of torsion. Additionally, significant cost savings may be obtained, particularly since the apertures of the torque and stationary hubs may be made by a process which is less expensive than broaching.

As one example of the above, the hub apertures may be of generally circular cross-section, with the torsion bar ends defining at least one flat, lateral portion to define a space between the lateral walls of the torsion bar ends and the apertures they occupy. A key member is forcefully inserted into the space defined above, to provide compressive retention to the torsion bar ends which, in turn, prevents undesired rotation of the torsion bars. Thus, the system may be made without broaching.

Preferably, more of the apertures are present in each hub than those occupied by torsion bars. This permits the later adding of torsion bars to increase torsion.

As another feature of this invention, the torsion bars present in the suspension unit occupy a housing of non-circular cross-section. Limiter plate means are carried on a rotatable portion of the suspension unit within the housing, typically on the torsion bas, particularly where a plurality of them are present. The limiter plate means is proportioned to be spaced from the housing in permitted rotational positions of the torsion bar suspension unit, but to engage the housing to prevent further rotation in at least one limiting rotational position, to prevent rotation to other, non-permitted rotational positions. Thus, excess torsion of the unit can be prevented.

As yet another feature of this invention, at least one of the stationary and torque hubs, and preferably both, are made of a stack of plates secured together in face-to-face relation. A major advantage of this is that each of the individual plates may have apertures for receiving the torsion bars punched into them. Thus, the punched apertures may be of non-circular cross-section, for example rectangular to receive a rectangular torsion bar end, if that is what is desired. Alternatively, a cylindrical torsion bar having ends stamped or cut into a D-shaped cross-section may be used, with the apertures in the plates being of similar shape. Thus, the plates may then be stacked and welded, or otherwise sealed together, to form the stationary and/or torque hubs, having non-circular apertures defined by the combined stack of plates, formed without expensive broaching. This, then, provides an additional way to manufacture the suspension unit of this invention at significantly reduced cost.

Additionally, the torsion bar ends may define a pattern of longitudinal ribs such as a star shape. The aperture receiving each bar end is then substantially shaped to the negative of said pattern, so that the torsion bar ends are snugly received in non-rotating configuration. This structure may be easily made by manufacturing the stationary and torque hubs out of a stack of plates having punched apertures, as described above.

Furthermore, one or both of the hubs may be made of sintered metal powder, as another alternative for manufacturing of those parts.

DESCRIPTION OF SPECIFIC EMBODIMENTS

Figure 1:
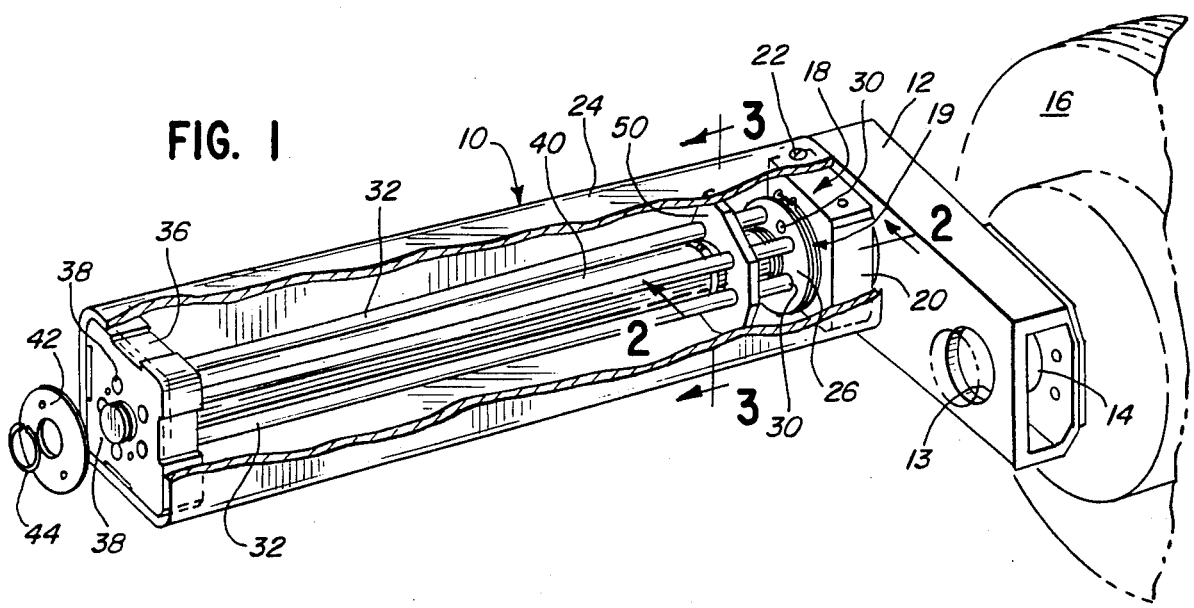
FIG. 1 is a perspective view, with a portion broken away, of one embodiment of the torsion bar suspension unit of this invention.
Figure 2:
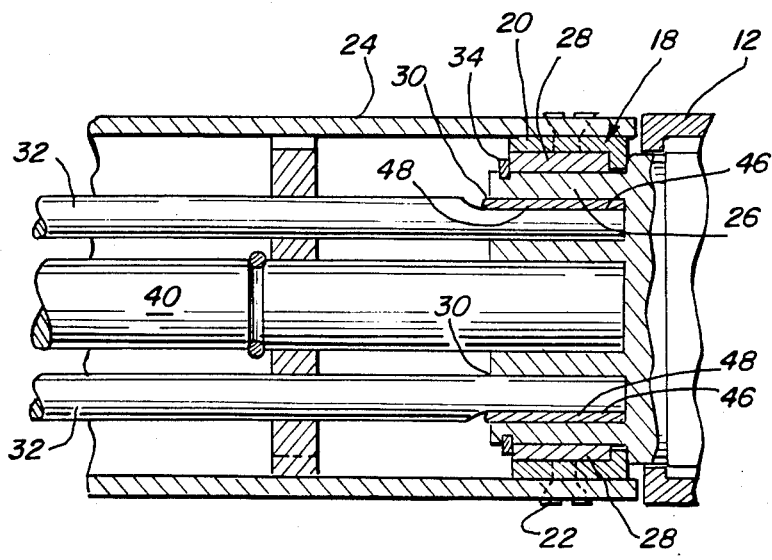
FIG. 2 is a fragmentary, longitudinal sectional view taken along line 2—2 of FIG. 1.

Referring to FIGS. 1 to 2, a torsion bar suspension unit 10 is shown, carrying a suspension arm 12 having an aperture 13 for carrying axle 14, which, in turn, may carry wheel 16. Thus, wheel 16 is carried on a suspension which is independent from other wheels on the vehicle, or any other device which carries suspension system 10.

Suspension system 10 includes a torque hub 18, which is capable of relatively rotary motion about bearing assembly 19, carried within outer hub 20, both assembly 19 and outer hub 20 comprising torque hub 18. As shown, bearing assembly 19 is attached to rotationally oscillatable arm 12 for suspending wheel 16.

Outer member 20 may be attached by bolts 22 to casing 24, which is shown to be of rectangular cross-section. The inner portion 26 of bearing assembly 19 is surrounded by a bearing member 28.

Inner portion 26 carries a plurality of apertures 30, at least some of which are filled by torsion bars 32. The inner portion 26 is attached by welding or other conventional means to rotatable arm 12, and is adapted to rotate with it, while outer portion 20 of torque hub 18 remains stationary, being affixed to casing 24 as stated above. Snap ring 34 (FIG. 2) holds the entire arrangement together.

At the other ends of torsion bars 32, rotationally stationary hub 36 is provided, having apertures 38 which are positioned about its center in a number and pattern typically identical to that of apertures 30 in the inner portion 26 of torque hub 18. Stationary hub 26 may also be conventionally attached by bolting or the like to housing 24. Accordingly, as arm 12 rotates, the inner portion 26 of torque hub 18 can rotate with it, while stationary hub 36 remains stationary, with the result that torsion bars 32 are twisted, storing potential energy and spring-back capability. Typically, the "rest" position of arm 12, where there is no torsion, may be at an acute angle of about 30 to 60 degrees extending downwardly from the horizontal. When under the rated maximum load, arm 12 is typically twisted into a substantially horizontal position.

Centrally positioned shaft 40 may be provided for rotational stabilization and strengthening of the suspension unit, with the ends of shaft 40 being respectively placed through hubs 18 and 36, as shown.

A cover ring 42 may be placed over the outer ends of apertures 38 of stationary hub 36. Cover plate 42 may be bolted on in a conventional manner, and/or may also be held on shaft 40 by snap ring 44.

In accordance with this invention, torsion bars 32 may be solid cylinders in shape at central areas spaced from their ends. This is distinctly preferable, when compared with using torsion bars which are of rectangular cross-section, for example. Under heavy torsion stress, rectangular bars can fail, beginning at their angled corners. Also, they tend to be more expensive than simple, cylindrical rods.

Figure 6:
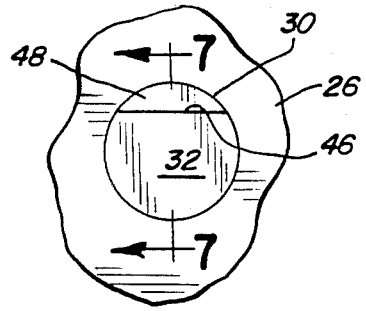
FIG. 6 is an end view of a torsion bar as mounted in the suspension unit of this invention.
Figure 7:
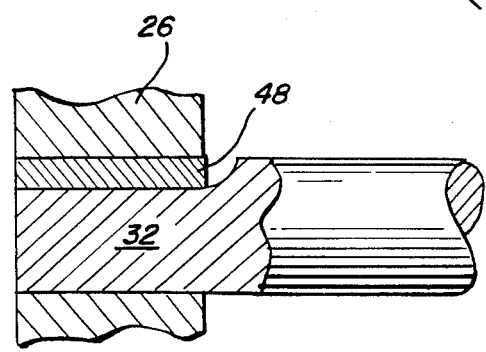
FIG. 7 is a fragmentary, sectional view taken along line 7—7 of FIG. 6.

Accordingly, to prevent the rotation of the preferred cylindrical torsion bars 32 used in this invention, the ends of bars 32 may be processed to have one or more flat faces 46, for example to exhibit a D-shaped cross-section (FIGS. 2 and 6). Thus, a space is initially defined between the lateral walls 46 of the torsion bar ends and the apertures 30 (or 38) that they occupy. However, a key number 48 is forcefully inserted into the space between each wall 46 of bar 32 and the wall of typically cylindrical aperture 30 (see particularly FIGS. 6–7). This forceful insertion can be of sufficient force that the wall of aperture 30 is distorted slightly out of its cylindrical configuration, so as to firmly prevent rotation of each torsion bar 32.

Accordingly, the desired cylindrical torsion bars 32 may be used in conjunction with cylindrical apertures 30 and 38 at each end of bar 32, while in both instances, key members 48 are used to prevent rotation of bars 32. This arrangement may preferably be used at both ends of bar 32, or at just one end if that turns out to be sufficient. Such an arrangement not only provides the improved functioning of cylindrical bars 32, but it represents a substantial manufacturing cost saving over the corresponding structure of the torsion bar suspension unit of the above-cited International Application.

Figure 8:
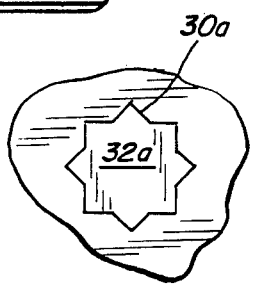
FIG. 8 is an end view of an alternate embodiment of a torsion bar used in this invention, shown mounted in the suspension unit.

FIG. 8 illustrates an alternative embodiment, in which an end of torsion bar 32a may be of a star-shaped cross-section, fitting into an aperture 30a, which is substantially shaped to the negative of the cross-section of torsion bar 32a. Such an aperture 30a may be found in either or both of inner hub portion 26 or stationary hub 36, to prevent rotation of bar 32a.

It can be seen that more of each of apertures 30, 38 are present than those occupied by torsion bars; see FIG. 1 in particular. The reason for this is to permit later adding of more torsion bars, to increase the tension of the suspension unit. This is easily done by removing cover 42, and sliding housing 24 off of the system. One then can then be simply add other torsion bars through the empty apertures 30, 38, which can be seen in FIG. 1. In the specific embodiment shown, there are two empty apertures 30 and two empty apertures 38, while four torsion bars 32 are present, occupying other apertures. This means that the load capacity of the suspension unit of this invention can be increased by about 50 percent without major modification, when that is desired. Conversely, torsion bars 32 may be removed from the system without major modification for a lighter load, down to only one remaining torsion bar 32, when a very light load and soft suspension is desired. Accordingly, the suspension unit of this system is extremely versatile in its load-carrying capacity, while providing a smooth, effective suspension to any of a very large range of load levels.

Figure 3:
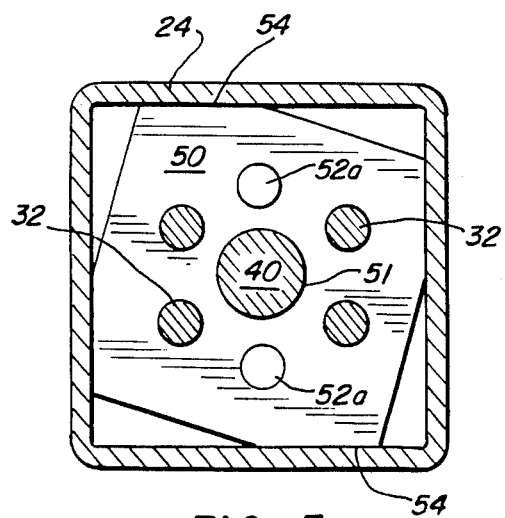
FIG. 3 is a transverse sectional view taken along line 3—3 of FIG. 1.

Limiter plate 50 is carried at a position spaced from the ends of torsion bars 32 in this particular embodiment. As shown particularly in FIG. 3, limiter plate 50 defines apertures 52, 52a, distributed about its center in a number and pattern typically corresponding to apertures 30, 38. As can be seen, apertures 52 are occupied by torsion bars 32, while apertures 52a are empty in the particular embodiment shown, but available for receiving additional torsion bars.

A central aperture 51 of limiter plate 50 is filled with central shaft 40.

Limiter plate 50 is generally placed on a portion of torsion bars 32 which exhibits significant torsional movement as arm 12 rotates during operation of the system, near torque hub 18. The purpose of limiter plate 50 is to prevent excess torsion from taking place in the suspension unit. Thus, as arm 12 is pushed upwardly by the load it is bearing, limiter plate 40 can rotate into the position shown in FIG. 3, in which flat sides 54 of the plate enter into engagement with the inner walls of non-circular housing 24. Housing 24 may be made of sturdy steel or the like, so that limiter plate 50 can rotate no further. This provides protection against excess torsion being imposed on torsion bars 32, which could cause them to be damaged.

As the load is released on arm 12 so that it rotates downwardly again, limiter plate 50 can rotate counter-clockwise (from the viewpoint of FIG. 3), out of engagement with casing 24, to permit normal functioning once again of the suspension unit. Accordingly, a precise limitation on the amount of torsional rotation of the system can be provided by appropriate adjustment of the exact angular relationships and positioning of edges 54 of limiter plate 50 within housing 24.

Such a limiter plate may also be used on other torsional suspension units besides those specifically disclosed in this present application. For example, plate 50 may be used in torsion suspension systems of the type disclosed in the cited International Application.

Figure 5:
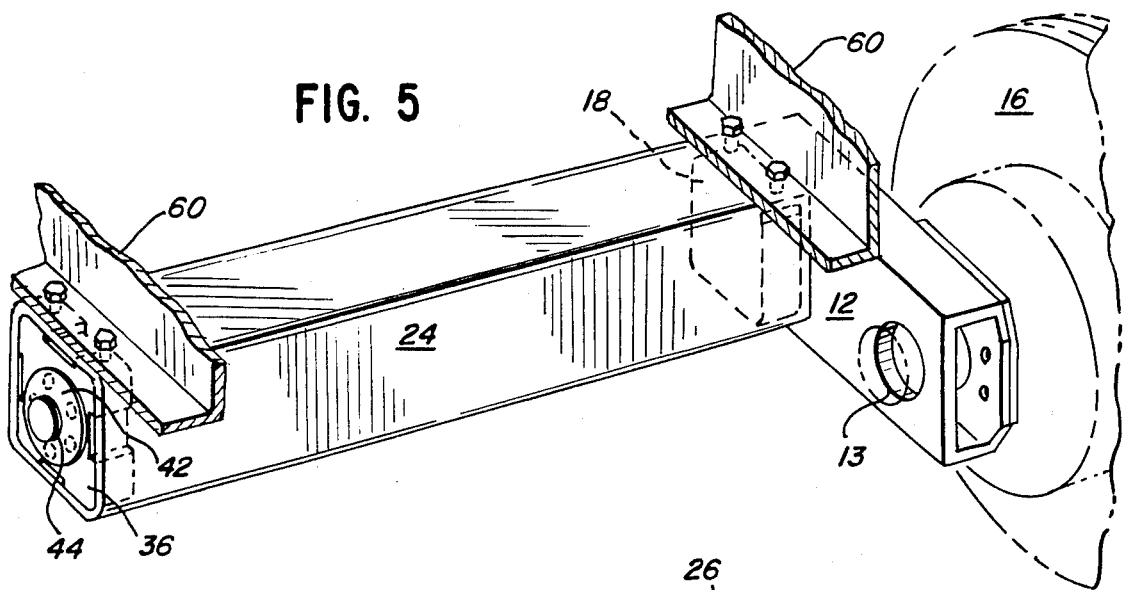
FIG. 5 is a perspective view of the torsion bar suspension unit of this invention, showing it attached to the undercarriage of a vehicle.

FIG. 5 shows the torsion bar suspension unit of FIG. 1 attached to the undercarriage 60 of a vehicle. It should be understood that, typically, what is shown is just a portion of the undercarriage on one side of the vehicle. Housing 24 in the usual case extends no more than half of the width of the vehicle, with another, identical torsion bar suspension unit being positioned on the other side of the vehcile and attached to the undercarriage. However, such is not absolutely necessary. Housing 24 could extend across the entire width of the vehicle, if desired. Likewise, axle 13 can extend the width of the vehicle and terminate in another wheel, and optionally another suspension system, on the other side, in those circumstances where it is desired to have two wheels on a common axle.

Figures 4A, 4B:
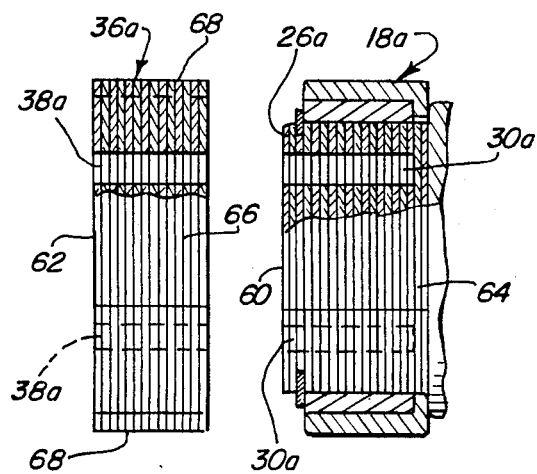
FIG. 4a is an elevational view, with a portion broken away, of a different embodiment of the inner portion of the torque hub of this invention.
FIG. 4b is a sectional view of a different embodiment of the rotationally stationary hub of this invention.

Referring to FIGS. 4a and 4b, alternate designs for torque hub 18a and stationary hub 36a are shown. Apart from the differences shown, the structure and functioning of the respective hubs 18a and 36a may be identical to the previous hubs 18, 36.

As the most significant difference, inner portion 26a of hub 18a and hub 36a are made of a plurality of stacked plates 60, 62 which have been punched with respective apertures.

For example, each plate 60 carries a central aperture 64 surrounded by a circular arrangement of apertures 30a, which correspond to apertures 30 and are for receiving torsion rods. It is of course an easy matter to punch out of each plate 60 the respective apertures 30a, 64. Apertures 30a may be of non-circular cross-section, if desired, so that as the plates 60 are stacked together and then welded on their periphery or otherwise held together, the non-circular apertures 30a may receive corresponding non-circular ends of torsion rods for non-rotating retention therein, while avoiding broaching in the process of manufacture. Accordingly, significant cost savings in manufacture can be achieved.

As stated above, the remaining parts of torque hub 18a may be unchanged from those of the prior torque hub 18.

Similarly, stationary hub 36a is made of the plurality of stacked plates 62 in which aperture 66 has been provided to receive a central shaft analogous to shaft 40, surrounded by an array of apertures 38a, having a purpose similar to apertures 38 of the previous embodiment.

As before, plates 62 may be punched out, with the apertures 62 and 38a being formed in any desired shape. Then, plates 62 are stacked and welded together on the outside, for example, as at 68. Alternatively, more apertures may be punched into the respective plates 60, 62, and rivets placed through them to hold the respective plates together.

Figure 9:
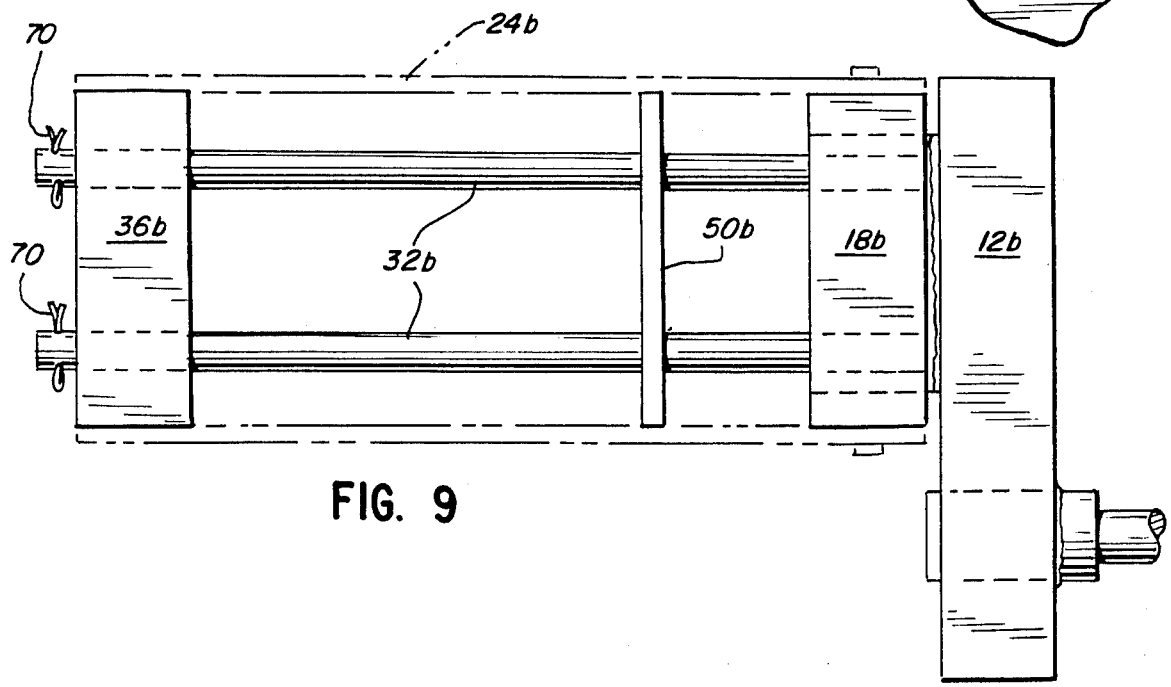
FIG. 9 is an elevational view of another embodiment of the torsion bar suspension unit of this invention.

Turning to FIG. 9, an alternative embodiment of the torsion bar suspension unit of this invention is provided in which no central shaft analogous to shaft 40 is provided.

As before, rotatable arm 12b, analogous to arm 12, is attached to the inner member of torque hub 18b, which is similar to torque hub 18. Stationary hub 36b is similar to hub 36 of the previous embodiment, while torsion rods 32b may be of any of the types described above in terms of the shape of their ends, which reside within hubs 18a, 36b. Rods 32b may extend through hub 36b and may carry a retaining cotter pin or key 70.

Limiter plate 50b may be substantially identical in structure to limiter plate 50 and in its mode of operation, as it limits torsion of the system by bearing against the interior of non-circular housing 24b.

The embodiment of FIG. 9 usually has at least three torsion rods 32b, since the torsion rods must not only provide the torsion but also the alignment and support of the system.

Accordingly, a torsion bar suspension unit is provided which exhibits significant advantages over the prior art, both in effectiveness of functioning, and in reduced cost of manufacture. It may be used to provide either dependent or independent wheel suspension to any of a large variety of vehicles or large objects as may be desired.

The above is offered for illustrative purposes only, and is not intended to limit the scope of the invention of this application, which is as defined in the claims below.

That which is claimed is:

1. In a torsion bar suspension unit which includes a bearing assembly including a torque hub capable of rotary motion in said bearing assembly; means for attaching said torque hub to a rotationally oscillatable member; a rotationally stationary hub spaced from said tarque hub; and at least one torsion bar secured in and extending between said torque hub and stationary hub, the improvement comprising, in combination:

said torsion bar being of generally circular cross-section in its intermediate portion spaced from its ends, said torsion bar ends fitting into apertures respectively defined in said torque and stationary hubs, said torsion bar ends defining at least one flat, lateral portion to define a space between the lateral walls of the torsion bar ends and the apertures they occupy, and a key member forcefully inserted in said space to provide compressive retention to said torsion bar ends to prevent rotation.

2. The suspension unit of claim 1 in which said torsion bars present occupy a housing of noncircular cross-section, and limiter plate means carried on a rotatable portion of said suspension unit within said housing, said limiter plate means being proportioned to be spaced from said housing in permitted rotational positions of said suspension unit, but to engage said housing to prevent further rotation of said rotatable portion in at least one limiting rotational position, to prevent rotation to other nonpermitted rotational positions.

3. The suspension unit of claim 1 in which at least one of said stationary and torque hubs are made of a stack of plates secured together in face-to-face relation.

4. The suspension unit of claim 1 which includes a centrally positioned shaft attached to said hubs and coaxially positioned relative to the axis of rotation of said unit.

5. The suspension unit of claim 1 in which said rotationally oscillatable member is a rotatable lever arm which carries a wheel.

6. The suspension unit of claim 1 in which at least one of said hubs is made of sintered metal powder.

7. In a torsion bar suspension unit which includes a bearing assembly including a torque hub capable of rotary motion in said bearing assembly; means for attaching said torque hub to a rotationally oscillatable member; a rotationally stationary hub spaced from said torque hub; and at least one torsion bar secured in and extending between the torque hub and stationary hub, the improvement comprising, in combination:

said torsion bar being of generally circular cross-section in its intermediate portion spaced from its ends, said torsion bar ends fitting into apertures respectively defined in said torque and stationary hubs, said torsion bar ends being of noncircular cross-section to prevent rotation, said apertures being of generally circular cross-section, said torsion bar ends defining at least one flat, lateral portion to define a space between the lateral walls of the torsion bar ends and the apertures they occupy; and a key member forcefully inserted in said space to provide compressive retention to said torsion bar ends in said apertures, more of said apertures being present than those occupied by torsion bars, to permit later adding of torsion bars to increase tension.

8. The suspension unit of claim 7 in which a plurality of said torsion bars occupy a housing of noncircular cross-section, and limiter plate means are carried on a rotatable portion of said suspension unit within said housing, said limiter plate means being proportioned to be spaced from said housing in permitted rotational positions of said suspension unit, but to engage said housing to prevent further rotation of said rotatable portion at at least one limiting rotational position, to prevent rotation to other, nonpermitted rotational positions.

9. The suspension unit of claim 8 in which at least one of said stationary and torque hubs are made of a stack of plates secured together in face-to-face relation.

10. The suspension unit of claim 9 which includes a centrally positioned bar attached to said hubs and coaxially positioned relative to the axis of rotation of said unit.

11. The suspension unit of claim 10 in which said rotationally oscillatable member is a rotatable lever arm which carries a wheel.

12. In a torsion bar suspension unit which includes a bearing assembly including a torque hub capable of rotary motion in said bearing assembly; means for attaching said torque hub to a rotationally oscillatable member; a rotationally stationary hub spaced from said torque hub; and torsion bar means secured in and extending between said torque hub and stationary hub, the improvement comprising, in combination;

said torsion bar means occupying a housing of noncircular cross-section, and limiter plate means carried on a rotatable portion of said suspension unit within said housing, said limiter plate means being proportioned to be spaced from said housing in permitted rotational positions of said suspension unit, but to engage said housing to prevent further rotation of said rotatable portion of at least one limiting rotational position, to prevent rotation to other, nonpermitted rotational positions.

13. The suspension unit of claim 12 in which said limiter plate means defines a plurality of apertures through which a plurality of torsion bars extend, said limiter plate being carried by said torsion bars.

14. The suspension unit of claim 12 in which at least one of said stationary and torque hubs are made of a stack of plates secured together in face-to-face relation.

15. The suspension unit of claim 12 in which torsion bar ends fit into apertures respectively defined in said torque and stationary hubs, said torsion bar ends being of noncircular cross-section to prevent rotation.

16. The suspension unit of claim 15 in which more of said apertures are present than those occupied by torsion bars, to permit later adding of torsion bars to increase tension.

17. The suspension unit of claim 12 in which at least one of said hubs is made of sintered metal powder.

18. The suspension unit of claim 12 in which said rotationally oscillatable member is a rotatable lever arm which carries a wheel.

19. The suspension unit of claim 12 in which said torsion bar ends define at least one flat, lateral portion to define a space between the lateral walls of the torsion bar ends and the apertures they occupy, and a key member forcefully inserted insaid space to provide compressive retention to said torsion bar ends in said apertures.

20. The suspension unit of claim 12 in which the ends of said torsion bars define a pattern of longitudinal ribs, the aperture receiving each bar end being substantially shaped to the negative of said pattern.

21. The suspension unit of claim 12 which includes a centrally positioned bar attached to said hubs and coaxially positioned relative to the axis of rotation of said unit.

22. In a torsion bar suspension unit which includes a bearing assembly including a torque hub capable of rotary motion in said bearing assembly; means for attaching said torque hub to a rotationally oscillatable member; a rotationally stationary hub spaced from said torque hub; at least one torsion bar secured and extending between said torque hub and stationary hub, the improvement comprising in combination:

at least one of said stationary and torque hubs being made of a stack of plates secured together in face-to-face relation.

23. The suspension unit of claim 22 in which a plurality of said torsion bars are present, and occupy a housing, and further including a centrally positioned bar attached to said hubs and coaxially positioned relative to the axis of rotation of said unit, the torsion bar ends fitting into apertures respectively defined in said torque and stationary hubs, there being more of said apertures present than those occupied by torsion bars, to permit later adding of torsion bars to increase tension.

24. The torsion bar suspension unit of claim 12 in which said limiter plate means has a generally polygonal periphery and is positioned within said housing, whereby said polygonal periphery is spaced from the interior of said housing in permitted angles of rotary motion, and a plurality of spaced sides of said polygonal periphery enter into engagement with the inner surface of said housing at a plurality of contact areas at said desired limit of rotary motion.

25. The torsion bar suspension unit of claim 24 in which a plurality of separate torsion bars are connected to said limiter plate means.

* * * * *